(12) United States Patent
Zuo et al.

(10) Patent No.: US 12,328,715 B2
(45) Date of Patent: Jun. 10, 2025

(54) COMMUNICATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventors: Xin Zuo, Shenzhen (CN); Jianbo Xu, Shenzhen (CN); Dan Zhang, Shenzhen (CN); Binhui Ning, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 186 days.

(21) Appl. No.: 17/326,164

(22) Filed: May 20, 2021

(65) Prior Publication Data

US 2021/0274516 A1   Sep. 2, 2021

Related U.S. Application Data

(63) Continuation of application No. PCT/CN2020/117063, filed on Sep. 23, 2020.

(30) Foreign Application Priority Data

Sep. 29, 2019   (CN) .................... 201910936481.X

(51) Int. Cl.
*H04W 72/121*   (2023.01)
*H04W 72/0446*   (2023.01)
(Continued)

(52) U.S. Cl.
CPC ..... *H04W 72/121* (2013.01); *H04W 72/0446* (2013.01); *H04W 72/30* (2023.01); *H04W 76/11* (2018.02)

(58) Field of Classification Search
CPC ... H04W 72/121; H04W 76/11; H04W 72/30; H04W 72/0446
See application file for complete search history.

(56) References Cited

U.S. PATENT DOCUMENTS 10,154,520 B1    12/2018  Hedayat et al.
2015/0111610 A1*  4/2015  Hwang ............. H04W 74/0816
                                            455/553.1
(Continued)

FOREIGN PATENT DOCUMENTS

CN    105357719 A    2/2016
CN    106487490 A    3/2017
(Continued)

OTHER PUBLICATIONS

3GPP, "Considerations on LAA-LTE UL Transmissions without LBT", 3GPP TSG RAN WG1, Meeting #83, Anaheim, CA, Nov. 15-22, 2015, R1-156983, 2 pgs.
(Continued)

*Primary Examiner* — Christopher M Crutchfield
*Assistant Examiner* — Alan L Lindenbaum
(74) *Attorney, Agent, or Firm* — Morgan, Lewis & Bockius LLP

(57) ABSTRACT

Embodiments of this application provide a communication method and apparatus, a computer-readable medium, and an electronic device. The communication method includes: generating a first message frame, the first message frame including group indication information of an access device, and the group indication information being configured for indicating information about a device group that performs data transmission after a transmission of the first message frame and the device group including one or more access devices; and transmitting the first message frame to the device group, to trigger the one or more access devices in the
(Continued)

device group indicated by the group indication information to perform the data transmission.

12 Claims, 11 Drawing Sheets

(51) Int. Cl.
*H04W 72/30* (2023.01)
*H04W 76/11* (2018.01)

(56) References Cited

U.S. PATENT DOCUMENTS

| | | | |
|---|---|---|---|
| 2016/0128024 A1* | 5/2016 | Frederiks | H04W 72/04 370/329 |
| 2016/0234831 A1* | 8/2016 | Tian | H04W 72/121 |
| 2016/0295581 A1 | 10/2016 | Ghosh et al. | |
| 2017/0013555 A1 | 1/2017 | Park et al. | |
| 2019/0007967 A1* | 1/2019 | Zhang | H04W 74/06 |
| 2019/0261273 A1* | 8/2019 | Kim | H04W 52/0229 |

FOREIGN PATENT DOCUMENTS

| | | |
|---|---|---|
| CN | 106506128 A | 3/2017 |
| CN | 108141876 A | 6/2018 |
| CN | 108604961 A | 9/2018 |
| CN | 109076596 A | 12/2018 |
| CN | 109315013 A | 2/2019 |
| CN | 109996343 A | 7/2019 |
| CN | 110381601 A | 10/2019 |
| CN | 110661608 A | 1/2020 |
| JP | 2013207383 A | 10/2013 |
| JP | 2013207384 A | 10/2013 |
| JP | 2015502107 A | 1/2015 |
| JP | 2016040918 A | 3/2016 |
| JP | 2018530222 A | 10/2018 |
| WO | WO 2018082770 A1 | 5/2018 |

OTHER PUBLICATIONS

Bo Yang et al., "Performance Analysis of Multi-Channel MAC with Single Transceiver for the Next Generation WLAN", Journal of Network and Computer Applications, vol. 146, Nov. 15, 2019, 4 pgs., Retrieved from the Internet: https://www.sciencedirect.com/science/article/abs/pii/S1084804519302425.

Kenichi Kawamura et al., "Cooperative Control of 802.llax Access Parameters in High Density Wireless LAN System", 2019 IEEE Wireless Communications and Networking Conference (WCNC), 4 pgs., Retrieved from the Internet: https://ieeexplore.ieee.org/document/8885425.

Tencent Technology, ISR, PCT/CN2020/117063, Dec. 14, 2020, 2 pgs.

Extended European Search Report and Supplementary Search Report, EP20870179.7, Nov. 11, 2022, 11 pgs.

Laurent Cariou (Intel), "Explanations for CR on 27.5.2.7 NDP Feedback Report", IEEE 802.11-17/0074r3, IEEE Mentor, Mar. 6, 2017, 33 pgs.

Tencent Technology, JP Office Action, Japanese Patent Application No. 2021-530181, Aug. 2, 2022, 12 pgs.

Yuki Nakato et al., "A CSMA/CA Scheme with Virtual Group for Two-hop WLAN Systems", Institute of Electronics, Information and Communication Engineers, Technical Research Report, vol. 111, No. 295, Nov. 10, 2011, 7 pgs.

Tencent Technology, WO, PCT/CN2020/117063, Dec. 14, 2020, 4 pgs.

Tencent Technology, IPRP, PCT/CN2020/117063, Mar. 15, 2022, 5 pgs.

* cited by examiner

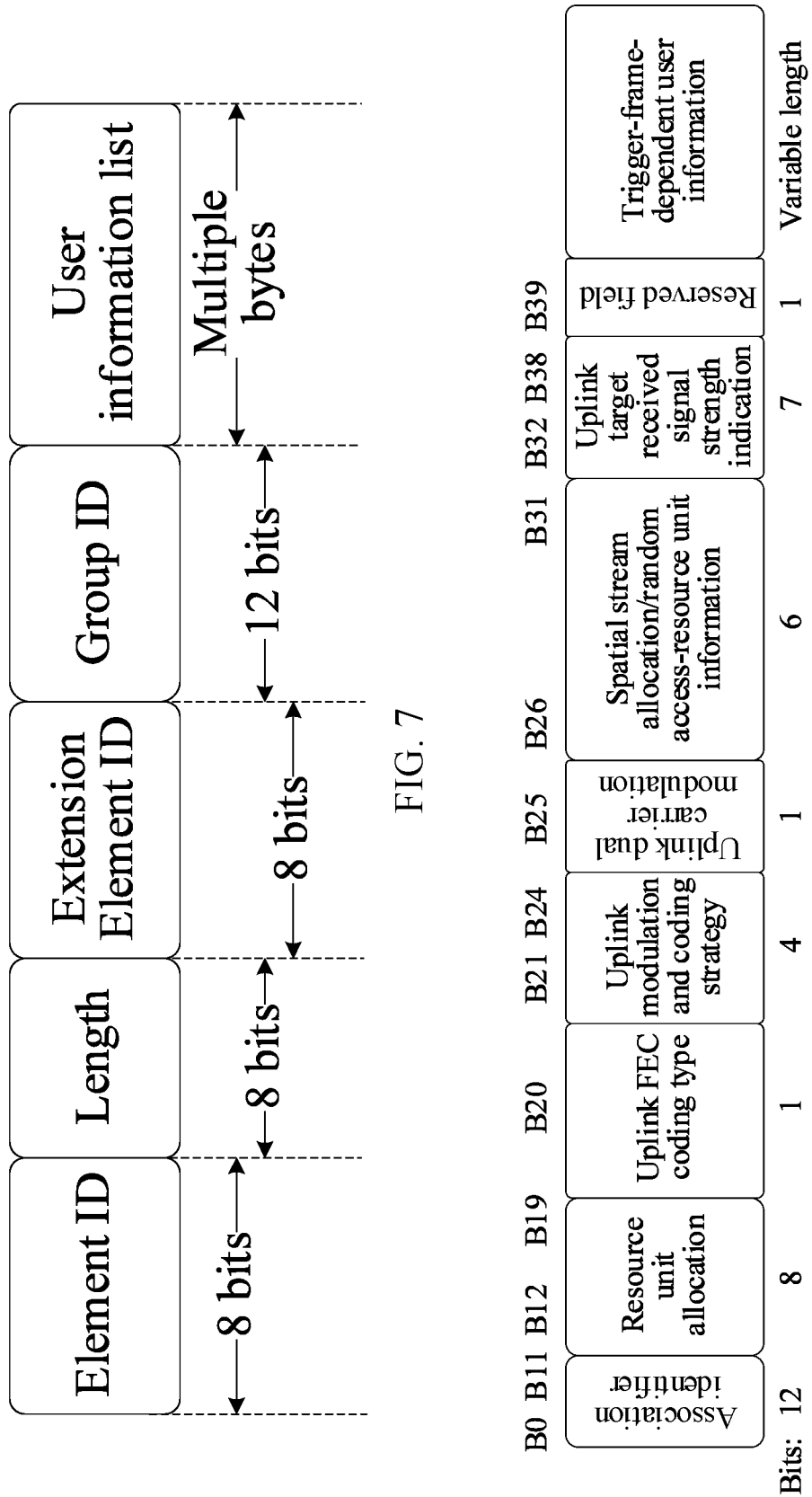

COMMUNICATION METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2020/117063, entitled "COMMUNICATION METHOD AND APPARATUS, COMPUTER-READABLE MEDIUM AND ELECTRONIC DEVICE" filed on Sep. 23, 2020, which claims priority to Chinese Patent Application No. 201910936481. X, filed with the State Intellectual Property Office of the People's Republic of China on Sep. 29, 2019, and entitled "COMMUNICATION METHOD AND APPARATUS, COMPUTER-READABLE MEDIUM, AND ELECTRONIC DEVICE", all of which are incorporated herein by reference in their entirety.

FIELD OF THE TECHNOLOGY

This application relates to the field of computer and communication technologies, and specifically, to a communication method and apparatus, a computer-readable medium, and an electronic device.

BACKGROUND OF THE DISCLOSURE

As Internet technology advances, various services and applications, such as real time applications (RTA), have high requirements on a wireless access network (e.g., a wireless local area network) in terms of throughput and latency, etc.

SUMMARY

Embodiments of this application provide a communication method and apparatus, a computer-readable medium, and an electronic device.

Other features and advantages of this application become obvious through the following detailed descriptions, or may be partially learned through the practice of this application.

According to an aspect of the embodiments of this application, a communication method is provided, which is executed by an electronic device, and includes: generating a first message frame, the first message frame including group indication information of an access device, and the group indication information being configured for indicating information about a device group that performs data transmission after a transmission of the first message frame and the device group including one or more access devices; and transmitting the first message frame to the device group, to trigger the one or more access devices in the device group indicated by the group indication information to perform the data transmission.

According to an aspect of the embodiments of this application, a communication apparatus is provided, including: a generating unit, configured to generate a first message frame, the first message frame including group indication information of an access device, and the group indication information being configured for indicating information about a device group that performs data transmission after a transmission of the first message frame and the device group including one or more access devices; and a transmitting unit, configured to transmit the first message frame to the device group, to trigger the one or more access devices in the device group indicated by the group indication information to perform the data transmission.

According to an aspect of the embodiments of this application, a non-transitory computer-readable storage medium is provided, storing a plurality of computer programs, the computer programs, when executed by a processor of an electronic device, implementing the communication method according to the foregoing embodiments.

According to an aspect of the embodiments of this application, an electronic device is provided, including: one or more processors; and a storage apparatus, configured to store one or more programs, the one or more programs, when executed by the one or more processors, causing the one or more processors to implement the communication method according to the foregoing embodiments.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings in the following description show only some embodiments of this application, and a person of ordinary skill in the art may still derive other drawings from these accompanying drawings without creative efforts. In the accompanying drawings:

FIG. 7 shows a schematic structural diagram of an element for transmitting group information according to an embodiment of this application.

FIG. 8 shows a schematic structural diagram of a user information field according to an embodiment of this application.

DESCRIPTION OF EMBODIMENTS

Figure 1:
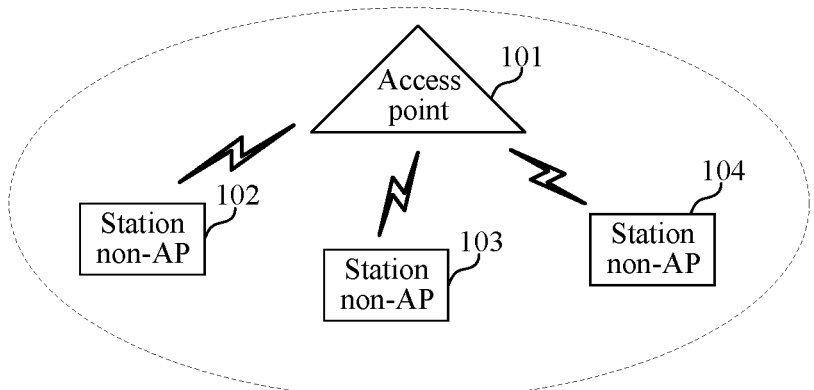
FIG. 1 shows a schematic diagram of an exemplary system architecture to which a technical solution according to an embodiment of this application can be applied.

At present, the exemplary implementations are described comprehensively with reference to the accompanying drawings. However, the examples of implementations may be implemented in a plurality of forms, and it is not to be understood as being limited to the examples described herein. Conversely, the implementations are provided to make this application more comprehensive and complete, and comprehensively convey the idea of the examples of the implementations to a person skilled in the art.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solution in this application may be implemented without one or more of the particular details, or another method, unit, apparatus, or step may be used. In other cases, well-known methods, apparatuses, implementations, or operations are not shown or described in detail, in order not to obscure the aspects of this application."

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For instance, some operations/steps may be further divided, while some operations/steps may be combined or partially combined. Therefore, an actual execution order may change according to an actual case.

The existing standard IEEE802.11ax cannot satisfy the low latency and low jitter requirements of RTAs in many scenarios; besides, a large number of RTA services causes an increased amount of signaling overhead, thereby affecting communication efficiency of a system.

In view of this, the embodiments of this application provide a communication method and apparatus, a computer-readable medium, and an electronic device. The technical solution in some embodiments of this application generates the first message frame including the group indication information of access devices, the group indication information being configured for indicating the information about the device groups that perform the data transmission after the transmission of the first message frame, so as to trigger the device groups indicated by the group indication information to perform the data transmission after transmitting the first message frame. As such, the first message frame can trigger one or more device groups to perform the data transmission, so as to reduce the signaling overhead, thereby improving the communication efficiency of the system and also satisfying the requirements of RTA services.

FIG. 1 shows a schematic diagram of an exemplary system architecture to which a technical solution according to an embodiment of this application can be applied.

As shown in FIG. 1, the system architecture may include an access point (AP) 101, a station (non-AP, STA) 102, a station 103, and a station 104. The access point 101, the station 102, the station 103, and the station 104 form a wireless local area network (LAN). The station may be a smart phone, a tablet computer, a portable computer, a desktop computer, etc.

The number of the access point and the stations shown in FIG. 1 is merely exemplary. Any number of access points and stations may be used according to implementation needs.

In an embodiment of this application, the access point 101 may generate a first message frame, which may be a trigger frame. The first message frame includes group indication information of access devices. The group indication information is configured for indicating information about device groups that perform data transmission after a transmission of the first message frame. For instance, in a case where the station 102, the station 103, and the station 104 belong to one device group, the first message frame generated by the access point 101 may include indication information about the group to which the station 102, the station 103, and the station 104 belong. As such, after transmitting the first message frame, the access point 101 can trigger the station 102, the station 103, and the station 104 to perform the data transmission. The technical solution according to the embodiment of this application is capable to trigger multiple devices to perform the data transmission by transmitting the first message frame, so as to reduce the signaling overhead, thereby improving the communication efficiency of the system.

The communication method provided in the embodiments of this application is generally executed by the access point 101. Correspondingly, the communication apparatus provided in the embodiments of this application is generally arranged at the access point 101.

The implementation details of the technical solution of this of this application are described in detail in the following.

Figure 2:
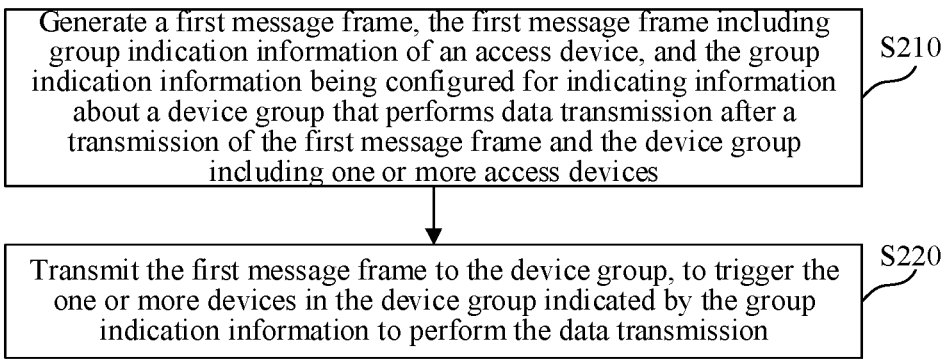
FIG. 2 shows a flowchart of a communication method according to an embodiment of this application.

FIG. 2 shows a flowchart of a communication method according to an embodiment of this application. The communication method may be executed by the access point, for instance, the access point 101 shown in FIG. 1. With reference to FIG. 2, the communication method includes at least step S210 to step S220. A detailed description is as follows:

In step S210, a first message frame is generated, the first message frame including group indication information of an access device, the group indication information being configured for indicating information about a device group that performs data transmission after a transmission of the first message frame and the device group including one or more access devices.

In an embodiment of this application, the first message frame may be a trigger frame, and the access device may be a station device. One device group may include one or more access devices.

In an embodiment of this application, the group indication information may include a first field and at least one of second fields. The first field is configured for indicating a quantity of device groups that perform data transmission after the transmission of the first message frame, and the quantity is equal to the number of the second fields. The second field is configured for indicating identifier information of the device group that performs data transmission after the transmission of the first message frame. For instance, in a case where the quantity of device groups indicated by the first field is 3, the group indication information includes three second fields, each of which indicates the identifier information of one corresponding device group.

In an embodiment of this application, the order in which each of the second fields included in the group indication information is arranged in the group indication information is configured for indicating a channel access order of the device groups indicated by the second fields. For instance, in a case where the group indication information includes three second fields that are arranged in order, respectively indicating device group 1, device group 2, and device group 3, the channel access order of the three device groups is device group 1, device group 2, and device group 3.

Figure 3:
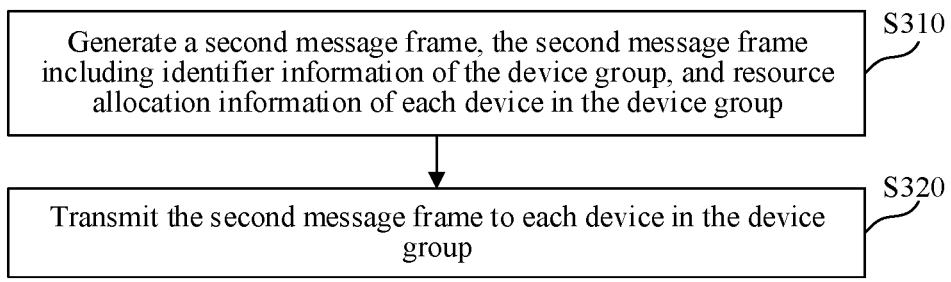
FIG. 3 shows a flowchart of a communication method according to an embodiment of this application.

In an embodiment of this application, resource allocation information of each device in the device group may be notified to each device before the transmission of the first message frame. Specifically, as shown in FIG. 3, a communication method according to an embodiment of this application may include step S310 to step S320 as follows.

In step S310, a second message frame is generated before the transmission of the first message frame, the second message frame including identifier information of the device group and resource allocation information of each device in the device group.

In an embodiment of this application, the resource allocation information of the device includes bandwidth resource information, transmission power information, modulation and coding scheme (MCS) for uplink transmission, and forward error correction (FEC) channel coding, etc.

In an embodiment of this application, the identifier information of the device group may be generated according to an association identifier (AID) of each device included in the device group.

Specifically, if the device group includes one device, the identifier information of the device group may be generated according to the association identifier of the device in the device group. For instance, the values of partial bits of the association identifier of the device in the device group may be used as the values of all bits of the identifier information of the device group, such as using the lower 12 bits of the association identifier as the identifier information of the device group. Alternatively or additionally, the values of partial bits of the association identifier of the device in the device group are used as the values of partial bits of the identifier information of the device group; for instance, the lower 8 bits of the identifier information of the device group use the lower 8 bits of the association identifier, and the upper 4 bits of the identifier information are customized by the access point. Alternatively or additionally, a value of each bit of the identifier information of the device group is set according to a value obtained by performing a calculation on a value of partial bits of the association identifier of the device in the device group and a set value; for instance, the lower 11 bits of the association identifier is added to 2046, so as to obtain the identifier information of the device group.

Specifically, if the device group includes at least two devices, the identifier information of the device group may be generated according to the association identifier of one device in the device group as described above, or generated according to the association identifiers of the at least two devices. For instance, partial bits of the association identifiers of the at least two devices may be spliced, so as to obtain each bit of the identifier information of the device group. For instance, in a case of generating the identifier information of the device group according to the association identifiers of the three devices in the device group, the lower 4 bits of the association identifiers of the three devices may be spliced to obtain the identifier information of the device group.

Continuing to refer to FIG. 3, in step S320, the second message frame is transmitted to each device in the device group.

The technical solution according to the embodiment shown in FIG. 3 enables the information about the device group and the resource allocation information of each device in the device group to be notified in advance to each device, so that each device can perform the data transmission based on the allocated resource after receiving the first message frame.

Based on the technical solution of the foregoing embodiments, in an embodiment of this application, the group indication information may further include at least one third field, the value of which is configured for indicating information about at least one device that performs data transmission after the transmission of the first message frame. The technical solution according to this embodiment enables the first message frame to trigger at least one device to perform the data transmission on the basis of triggering the device group.

In an embodiment of this application, the at least one device indicated by the third field and the devices in the device group indicated by the second field previous to the third field have the same channel access order during the data transmission. For instance, in a case where the device indicated by the third field is device 4, and the device group indicated by the second field previous to the third field includes device 1, device 2, and device 3, then device 4 has the same channel access order as device 1, device 2, and device 3.

In some embodiments of this application, based on the foregoing solution, the third field includes at least one device information field, each of which is configured for indicating resource allocation information of one device. Each device information field includes a designated bit, the value of which is configured for indicating whether a next field is the device information field. For instance, in a case where the device information field is User Info, the designated bit may be bit B39 in the User Info field. If B39=1, it indicates that the next field is still User Info; and if B39=0, it indicates that the next field is not User Info.

Continuing to refer to FIG. 2, in step S220, the first message frame is transmitted to the device group, to trigger the one or more access devices in the device group indicated by the group indication information to perform the data transmission.

In an embodiment of this application, in a case where the first message frame is a trigger frame, the group indication information may be multiplexed with the device information field (i.e., User Info field) in the trigger frame.

In some embodiments of this application, the first message frame may further include a trigger type field, which is configured for indicating a type of the first message frame. In a case where the first message frame is a trigger frame, the trigger type field may be multiplexed with the common information field (i.e., Common Info field) in the trigger frame.

The following describes the technical solution according to the embodiments of this application in detail with reference to FIGS. 4 to 12, in which, as an example, the above-mentioned first message frame is a trigger frame.

Figure 4:
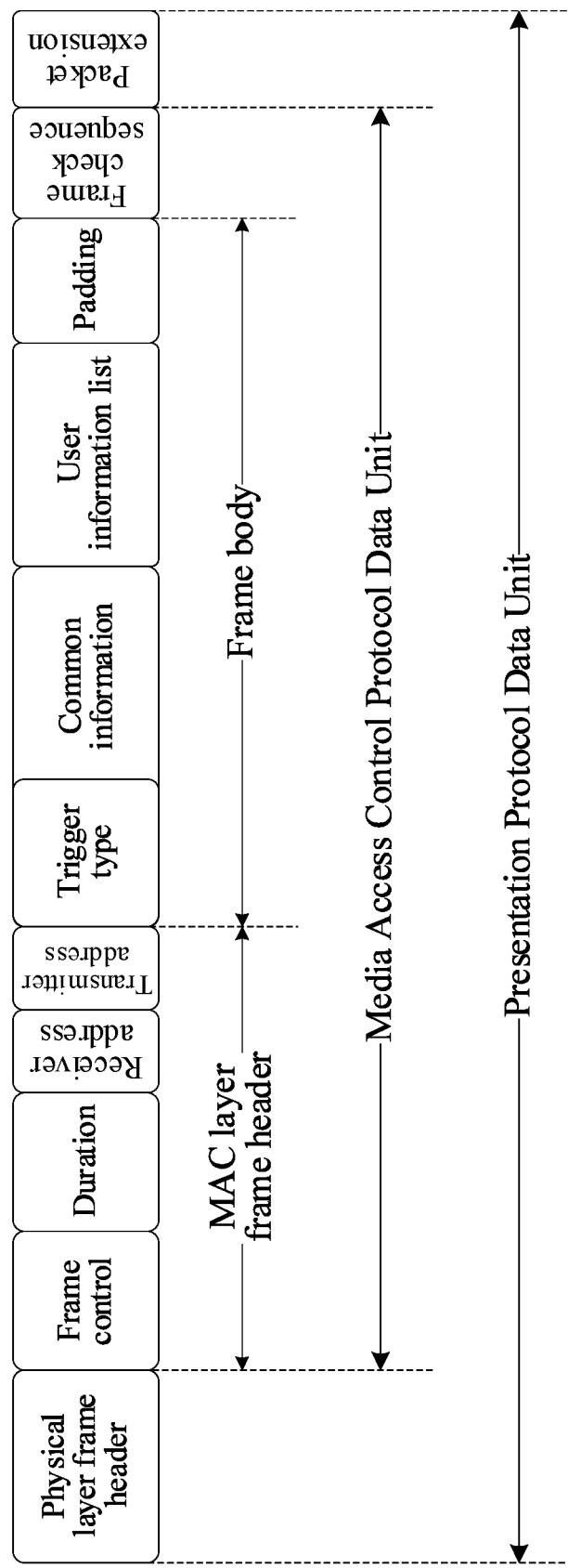
FIG. 4 shows a schematic structural diagram of a trigger frame.

Referring to FIG. 4, the trigger frame in 802.11ax may be a Presentation Protocol Data Unit (PPDU, a physical layer protocol data unit). The PPDU is a data frame formed by adding a physical layer frame header (PHY Header) and a packet extension (PE) field on the basis of a Media Access Control Protocol Data Unit (MPDU). The MPDU includes a Media Access Control (MAC) layer frame header (MAC Header), a frame body, and a frame check sequence (FCS). The MAC Header includes a frame control (FC) field, a duration field, a receiver address (RA) field, and a transmitter address (TA) field. The main body includes a common information (i.e., Common Info) field, a user information list (i.e., User Info List) field, and a padding field.

Figure 5:
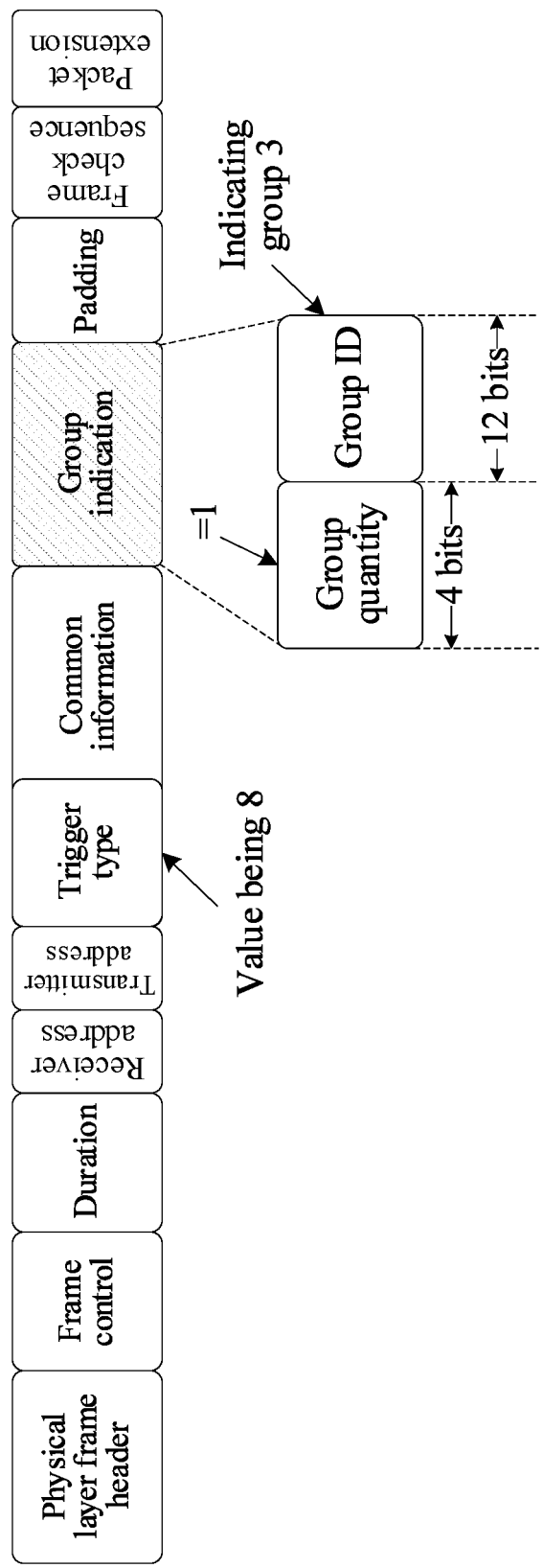
FIG. 5 shows a schematic structural diagram of a trigger frame according to an embodiment of this application.

In an embodiment of this application, as shown in FIG. 5, which shows a trigger frame according to the embodiment of this application. The value of the "Trigger Type" field of the trigger frame may be set to indicate that the trigger frame is used for indicating the device group, for instance, setting the value of the "Trigger Type" field to 8 (a reserved value of the "Trigger Type" field of the trigger frame in 802.11ax). In addition, the User Info field of the raw trigger frame may be multiplexed as the group indication field.

In an embodiment of this application, the group indication field includes a "group quantity" field and a "group ID" field. The "group quantity" field may be 4 bits, and the "group ID" field may be 12 bits.

Figure 6:
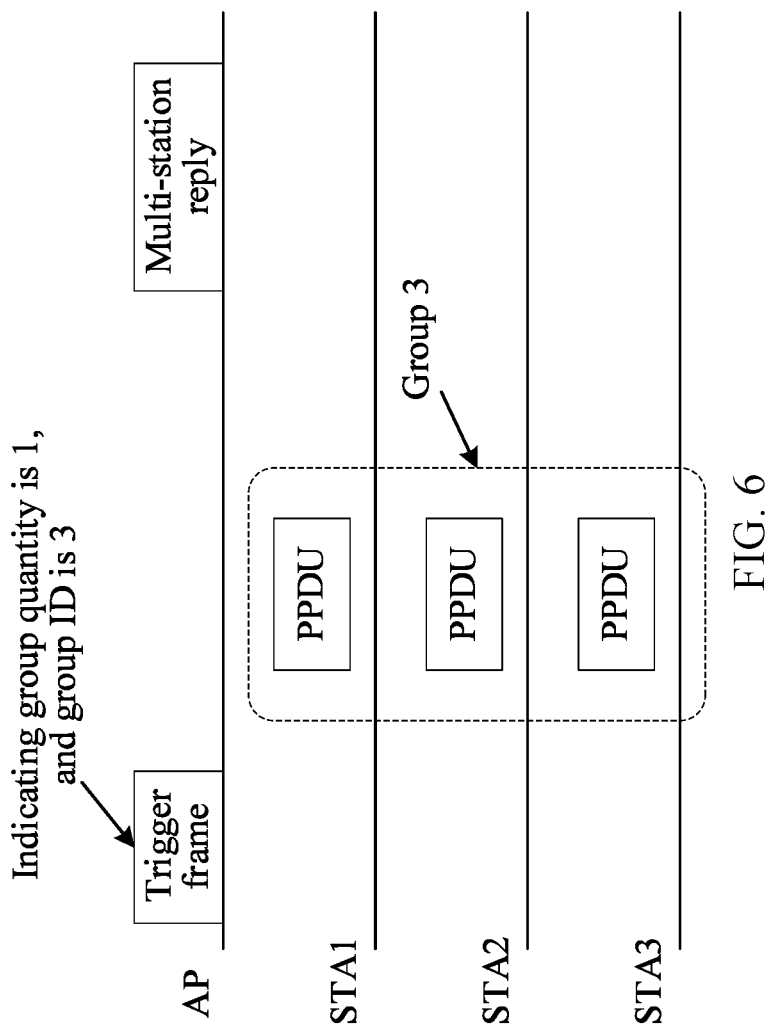
FIG. 6 shows a flowchart of data exchange according to an embodiment of this application.

In an embodiment of this application, the "group quantity" field is configured for indicating the number of subsequent group accesses, namely, the number of "group ID" fields. 0 and 8 to 15 are reserved values of the "group quantity" field; the value of the "group quantity" field ranges from 0 to 7, indicating the number of group accesses triggered by the trigger frame provided in the embodiment of this application. The "Group ID" field is configured for indicating a predefined group number, which is allocated by the AP. The value of the "Group Quantity" field is equal to the number of the "Group ID" fields. In the embodiment shown in FIG. 5, the trigger frame triggers one group access, and the group ID is group 3. The specific data exchange process is shown in FIG. 6. After the AP transmits the trigger frame (the trigger frame indicating that the group quantity is 1, and the group ID is 3), STA1, STA2, and STA3 in the group 3 indicated by the trigger frame transmit PPDUs. After receiving the PPDU transmitted by each STA in group 3, the AP performs multi-station reply.

In an embodiment of this application, the device group triggered by the trigger frame (the value of the "Trigger Type" field may be 8) transmits uplink data according to configurations corresponding to the pre-saved group ID. These configurations include bandwidth resource allocation, transmission power indication, uplink transmission MCS, FEC channel coding, etc., of each station in the device group. These configurations are transmitted to each participating station before the transmission of the trigger frame; correspondingly, the station saves the group ID and the corresponding configuration information after receiving these configurations. In an embodiment of this application, a new element may be used to transmit these configurations, as shown in FIG. 7, including: an Element ID field, a Length field, an Extension (i.e., Element ID Extension) field, a Group ID field, and a User Information List (i.e., User Info List) field. Besides, in an embodiment, the Element ID field may be 8 bits, the Length field may be 8 bits, the Extension field may be 8 bits, the Group ID field may be 12 bits, and the User Info List field may be multiple bytes.

In an embodiment of this application, the value of the Element ID field may be 255; the value of the Extension field may be 61 or any other legal value that has not been adopted (between 0-255); the Length field indicates the number of bytes in the entire field; the Group ID field indicates the ID of the device group; and the User Info List field includes one or more User Info fields. The structure of the User Info field is shown in FIG. 8, including: an association identifier (i.e., AID) field, a resource unit allocation (RU Allocation) field, an uplink FEC coding type (UL FEC Coding Type) field, an uplink modulation and coding strategy (UL MCS) field, an uplink dual carrier modulation (UL DCM for short) field, a spatial stream allocation/random access-resource unit information (SS Allocation/RA-RU Information) field, an uplink target received signal strength indication (UL Target RSSI for short) field, a reserved field, and a trigger-frame-dependent user information (i.e., Trigger Dependent User Info) field. The AID field may occupy 12 bits, the RU Allocation field may occupy 8 bits, the UL FEC Coding Type field may occupy 1 bit, the UL MCS field may occupy 4 bits, and the UL DCM field may occupy 1 bit, the SS Allocation/RA-RU Information field may occupy 6 bits, the UL Target RSSI field may occupy 7 bits, the reserved field may occupy 1 bit, and the length of the Trigger Dependent User Info field is variable.

In an embodiment of this application, the resource allocation information, such as the bandwidth resource allocation and the transmission power indication, etc., of each station included in the device group may also be notified to the station in other formats.

In an embodiment of this application, the group ID may be set in accordance with the setting of the AID subfield in the User Info field. Specifically, the setting may be performed as follows:

(1) The 8 bits of the group ID field may be set to be associated with the AID of one or more stations in the group and added to 2046. For instance:

If group 2 includes only one station 2 (AID is 2), the 12 bits of the group ID are a result of the lower 11 bits of the AID of the station plus 2046. Herein, the group ID corresponding to group 2 is 2+2046=2048 in decimal; and If group 3 includes multiple stations, and one of the multiple stations, such as station 3 (AID is 3), may be selected, the 12 bits of the group ID are a result of the lower 11 bits of the AID=3 of the station plus 2046. Herein, the group ID corresponding to group 3 is 3+2046=2049 in decimal.

If the group includes multiple stations, such as station 1, station 2, and station 3, the group ID may be spliced by the AIDs of the multiple participating stations. For instance, the lower 4 bits of the group ID are the lower 4 bits of the AID of station 1, the middle 4 bits of the group ID are the lower 4 bits of the AID of station 2, and the upper 4 bits of the group ID are the lower 4 bits of the AID of station 3; then, the group ID is added to 2046, so as to obtain the final group ID.

(2) Partial bits of the group ID field may be associated with the AID of one or more stations included in the group, and the remaining bits are defined by the AP. For instance, the lower 8 bits in the 12 bits of the group ID may be the lower 8 bits of the AID of station 3, and the upper 4 bits of the group ID may be allocated by the AP, for instance, according to different RTA services for differentiation.

The value of the group ID lies between 2046 and 4095, but does not include 2046 and 4095.

Figure 9:
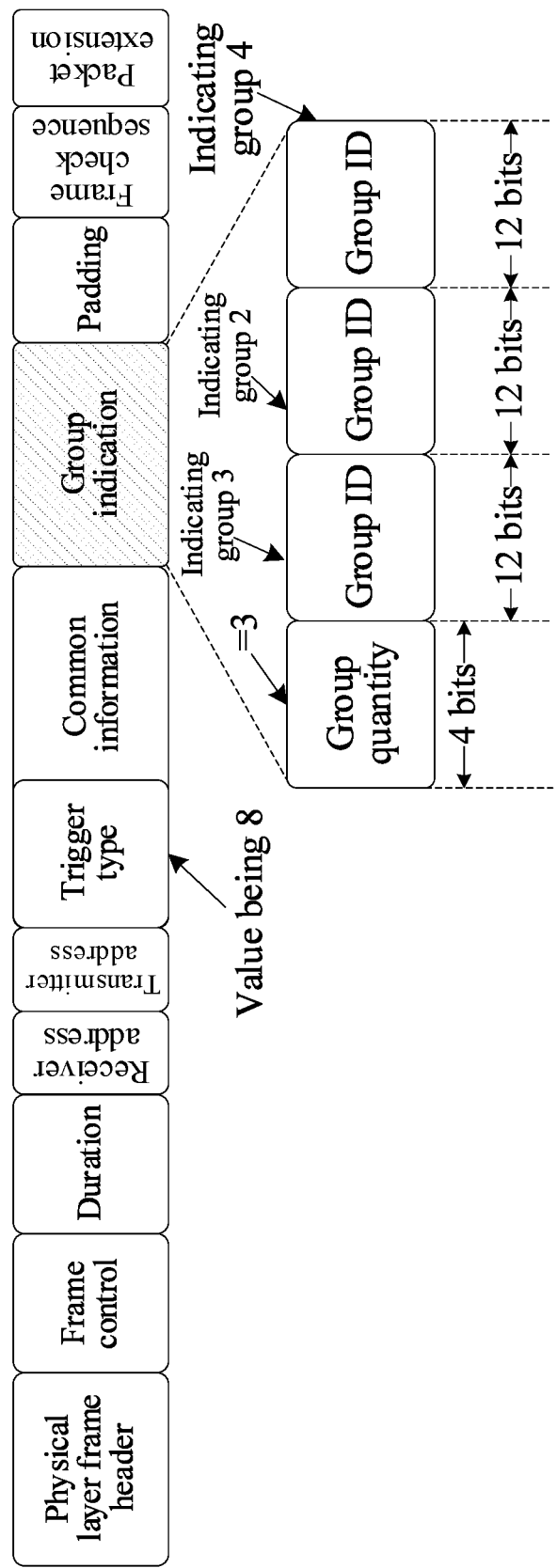
FIG. 9 shows a schematic structural diagram of a trigger frame according to an embodiment of this application.
Figure 10:
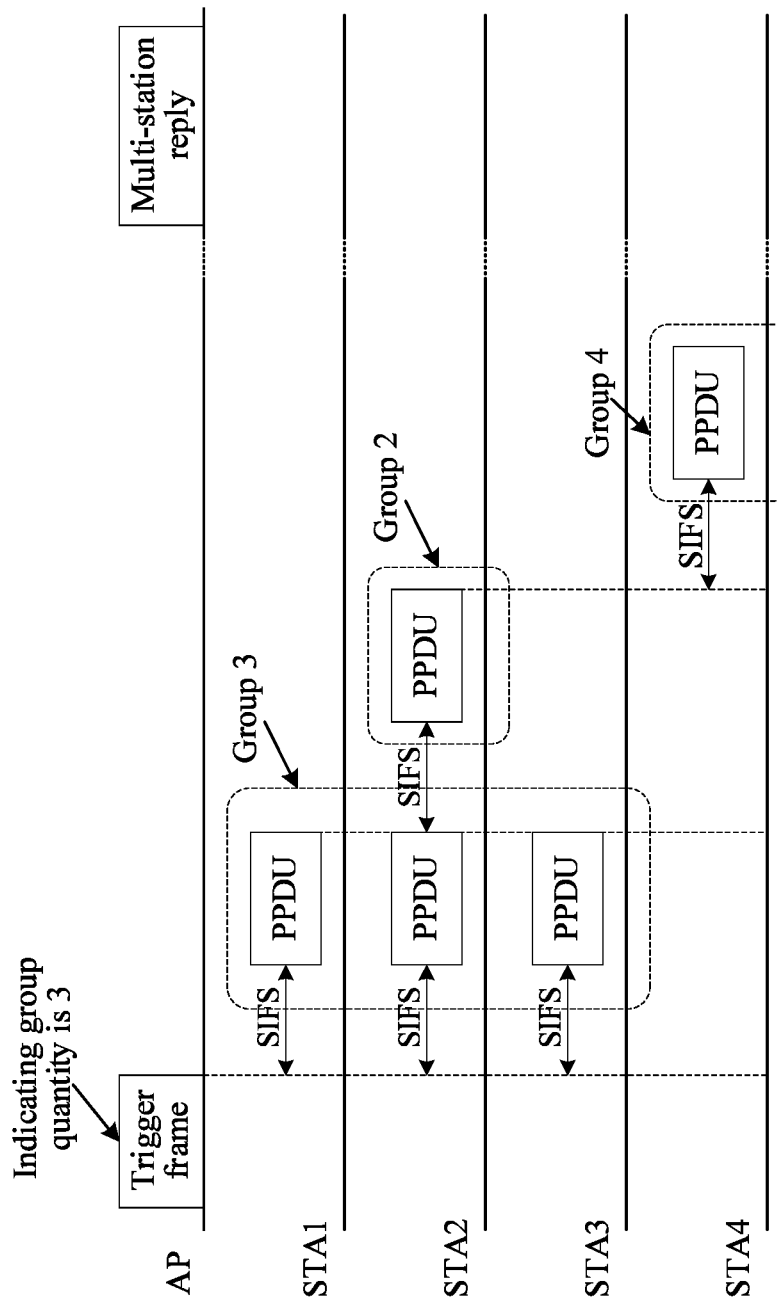
FIG. 10 shows a flowchart of data exchange according to an embodiment of this application.

In an embodiment of this application, as shown in FIG. 9, the trigger frame can trigger accesses of multiple device groups. Herein, the value indicated by the group quantity field is 3, and the group indication field includes 3 group ID fields, for instance, respectively indicating group 3, group 2 and group 4. As shown in FIG. 9, according to the order in which the group ID fields respectively indicating group 3, group 2 and group 4 are arranged in the group indication field, the channel access order may be determined to be group 3, group 2, and group 4. The data frame transmitted by each station in group 3 is a PPDU based on the trigger frame. Each station in group 2 starts the data transmission after each station in group 3 completes the transmission, and each station in group 4 starts the data transmission after each station in group 2 completes the transmission. The specific data exchange process is shown in FIG. 10. After the AP transmits the trigger frame (the trigger frame indicating the group quantity is 3) and a short interframe space (SIFS) has elapsed, first, STA1, STA2 and STA3 in group 3 indicated by the trigger frame transmit PPDUs; STA2 in group 2 transmits a PPDU after each station in group 3 completes the transmission and a SIFS has elapsed; and STA4 in group 4 transmits a PPDU after the station in group 2 completes the transmission and a SIFS has elapsed. Finally, after receiving the PPDUs transmitted by the STAs in each group, the AP performs the multi-station reply.

In the embodiment shown in FIG. 9, since the trigger frame can trigger accesses of multiple device groups, the access point transmits configuration information of group IDs=3, 2, 4 to the triggered STAs before transmitting the trigger frame. In a case of the group ID=3, the User Info List in the Element of the configuration information includes three User Info fields; and in a case of the group ID=2 or 4, the User Info List in the Element of the configuration information includes only one User Info field.

Figure 11:
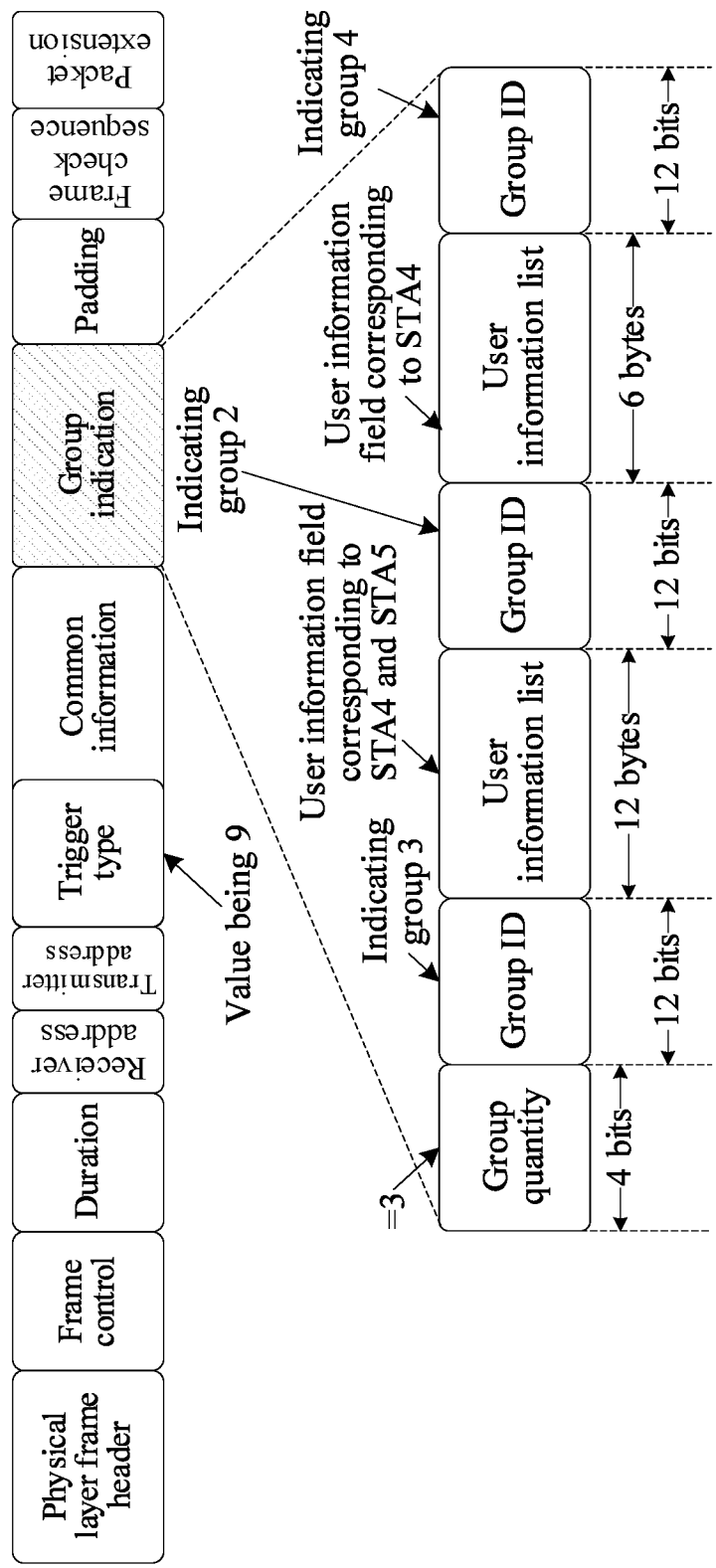
FIG. 11 shows a schematic structural diagram of a trigger frame according to an embodiment of this application.

In an embodiment of this application, on the basis of indicating the group information, the trigger frame may also indicate the information about the stations that perform data transmission. Specifically, as shown in FIG. 11, the value of the "Trigger Type" field of the trigger frame may be set to 9 (different from 8 in the foregoing embodiment, which is a reserved value for the "Trigger Type" field of the trigger frame in 802.11ax). The group indication field may include a "User Info List" field in addition to the "group quantity" field and the "group ID" field. The definitions and related descriptions of the "group quantity" field and the "group ID" field may refer to the technical solution provided in the foregoing embodiments. Here, the "User Info List" field may use the unused bandwidth in the group ID to trigger other stations to transmit PPDUs based on the trigger frame (i.e., TB PPDU).

In an embodiment of this application, the "User Info List" field includes one or more "User Info" fields. The reserved bit B39 in the User Info field may be used for indicating whether a next field is User Info. For instance, if B39=1, it indicates that the next field is still User Info; and if B39=0, it indicates that the next field is not User Info.

Figure 12:
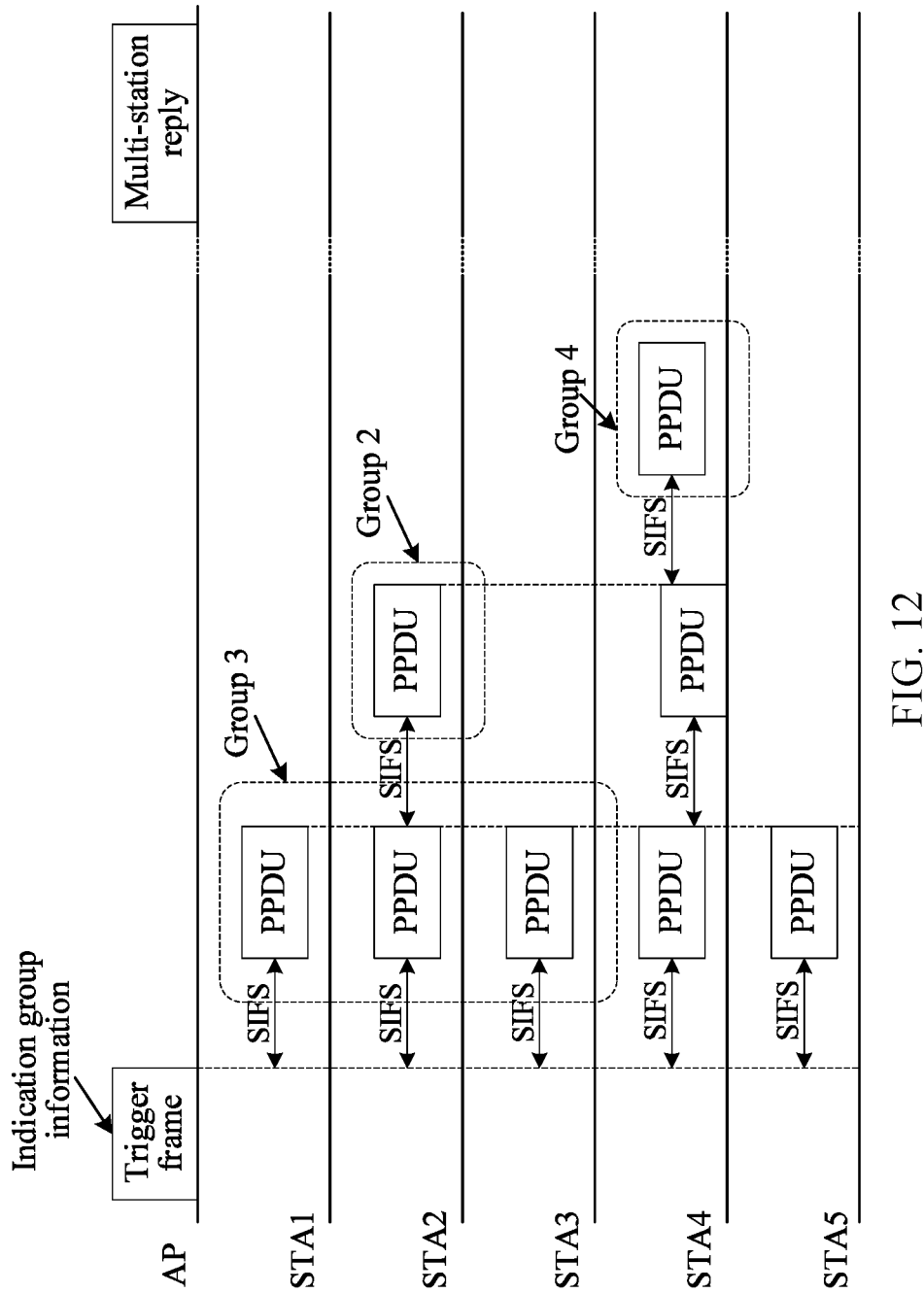
FIG. 12 shows a flowchart of data exchange according to an embodiment of this application.

In an embodiment of this application, the STAs corresponding to the "User Info List" field included in the "Group Indication" field may transmit PPDUs together with the STAs corresponding to the previous group ID. Specifically, as shown in FIG. 12, after the AP transmits the trigger frame (the trigger frame indicating the group information) and a SIFS has elapsed, STA1, STA2, and STA3 in group 3 indicated by the trigger frame, and STA4 and STA5 indicated by the User Info List field subsequent to the Group ID=3 in the "Group Indication" field first transmit PPDUs; after STA1, STA2, STA3, STA4 and STA5 completes the transmission and a SIFS has elapsed, STA2 in group 2 and STA4 indicated by the User Info List field subsequent to the Group ID=2 in the "Group Indication" field transmits PPDUs; and after STA2 and STA4 completes the transmission and a SIFS has elapsed, STA4 in group 4 transmits a PPDU. Finally, after receiving the PPDUs transmitted by the STAs in each group, the AP performs the multi-station reply.

The technical solution of the foregoing embodiment of this application can realize the scheduling of static uplink data frame transmission through group indication information, and reduce the signaling overhead. Specifically, the indication information of the common info and user info fields in the trigger frame is statically fixed and fixed. It is the group information, and then only the group indication information can be carried in the new trigger frame to complete the triggered station indication and related bandwidth resource allocation, transmission power indication, etc. At the same time, one trigger frame can trigger multiple transmissions of TB PPDUs, which further reduces signaling overhead, and at the same time more satisfies the needs of RTA services.

The following describes apparatus embodiments of this application, and the apparatus embodiments may be used for performing the communication method in the foregoing embodiment of this application. For details not disclosed in the apparatus embodiments of this application, reference may be made to the foregoing communication method embodiments of this application.

Figure 13:
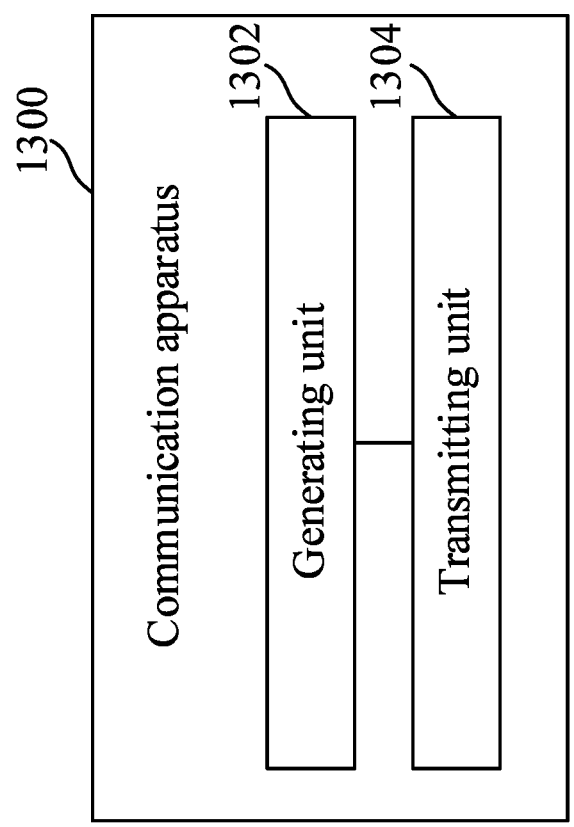
FIG. 13 shows a block diagram of a communication apparatus according to an embodiment of this application.

FIG. 13 shows a block diagram of a communication apparatus according to an embodiment of this application. The communication apparatus may be arranged in an access point device.

Referring to FIG. 13, a communication apparatus 1300 according to an embodiment of this application includes: a generating unit 1302 and a transmitting unit 1304.

The generating unit 1302 is configured to generate a first message frame, the first message frame including group indication information of an access device, and the group indication information being configured for indicating information about a device group that performs data transmission after a transmission of the first message frame. The transmitting unit 1304 is configured to transmit the first message frame, to trigger the device group indicated by the group indication information to perform the data transmission.

In some embodiments of this application, based on the foregoing solution, the group indication information includes a first field and at least one second field. The first field is configured for indicating a quantity of the device groups that perform data transmission after the transmission of the first message frame, the quantity being equal to the number of the second fields. The second field is configured for indicating identifier information of the device group that performs data transmission after the transmission of the first message frame.

In some embodiments of this application, based on the foregoing solution, an order in which each of the second fields included in the group indication information is arranged in the group indication information is configured for indicating a channel access order of the device groups indicated by the second fields.

In some embodiments of this application, based on the foregoing solution, the generating unit 1302 is further configured to: generate a second message frame, the second message frame including identifier information of the device group and resource allocation information of each device in the device group. The transmitting unit 1304 is further configured to: transmit the second message frame to each device in the device group before transmitting the first message frame.

In some embodiments of this application, based on the foregoing solution, the generating unit 1302 is further configured to generate the identifier information of the device group according to an association identifier of each device included in the device group.

In some embodiments of this application, based on the foregoing solution, the generating unit 1302 is configured to:

in a case where the device group includes one of more devices, generate the identifier information of the device group according to the association identifier of one device in the device group; and in a case where the device group includes at least two devices, generate the identifier information of the device group according to the association identifiers of the at least two devices in the device group.

In some embodiments of this application, based on the foregoing solution, the generating unit 1302 is configured to generate the identifier information of the device group according to the association identifier of the one device in the device group, including: using a value of partial bits of the association identifier of the one device in the device group as a value of all bits of the identifier information of the device group; or using a value of partial bits of the association identifier of the one device in the device group as a value of partial bits of the identifier information of the device group; or setting a value of each bit of the identifier information of the device group according to a value obtained by performing a calculation on a value of partial bits of the association identifier of the one device in the device group and a set value.

In some embodiments of this application, based on the foregoing solution, the generating unit 1302 is configured to generate the identifier information of the device group according to the association identifiers of the at least two devices in the device group, including: splicing partial bits of the association identifiers of the at least two devices, to obtain each bit of the identifier information of the device group.

In some embodiments of this application, based on the foregoing solution, the first message frame is a trigger frame, and the group indication information is multiplexed with a device information field of the trigger frame.

In some embodiments of this application, based on the foregoing solution, the first message frame further includes a trigger type field, which is configured for indicating a type of the first message frame. In a case where the first message frame is the trigger frame, the trigger type field is multiplexed with a common information field of the trigger frame.

In some embodiments of this application, based on the foregoing solution, the group indication information further includes at least one third field; the value of the third field is configured for indicating information about at least one device that performs data transmission after the transmission of the first message frame.

In some embodiments of this application, based on the foregoing solution, the at least one device indicated by the third field and each device in the device group indicated by the second field previous to the third field have the same channel access order during the data transmission.

In some embodiments of this application, based on the foregoing solution, the third field includes at least one of device information fields, each of which is configured for indicating resource allocation information of one device. Each of the device information fields includes a designated bit, and a value of the designated bit is configured for indicating whether a next field is the device information field.

Figure 14:
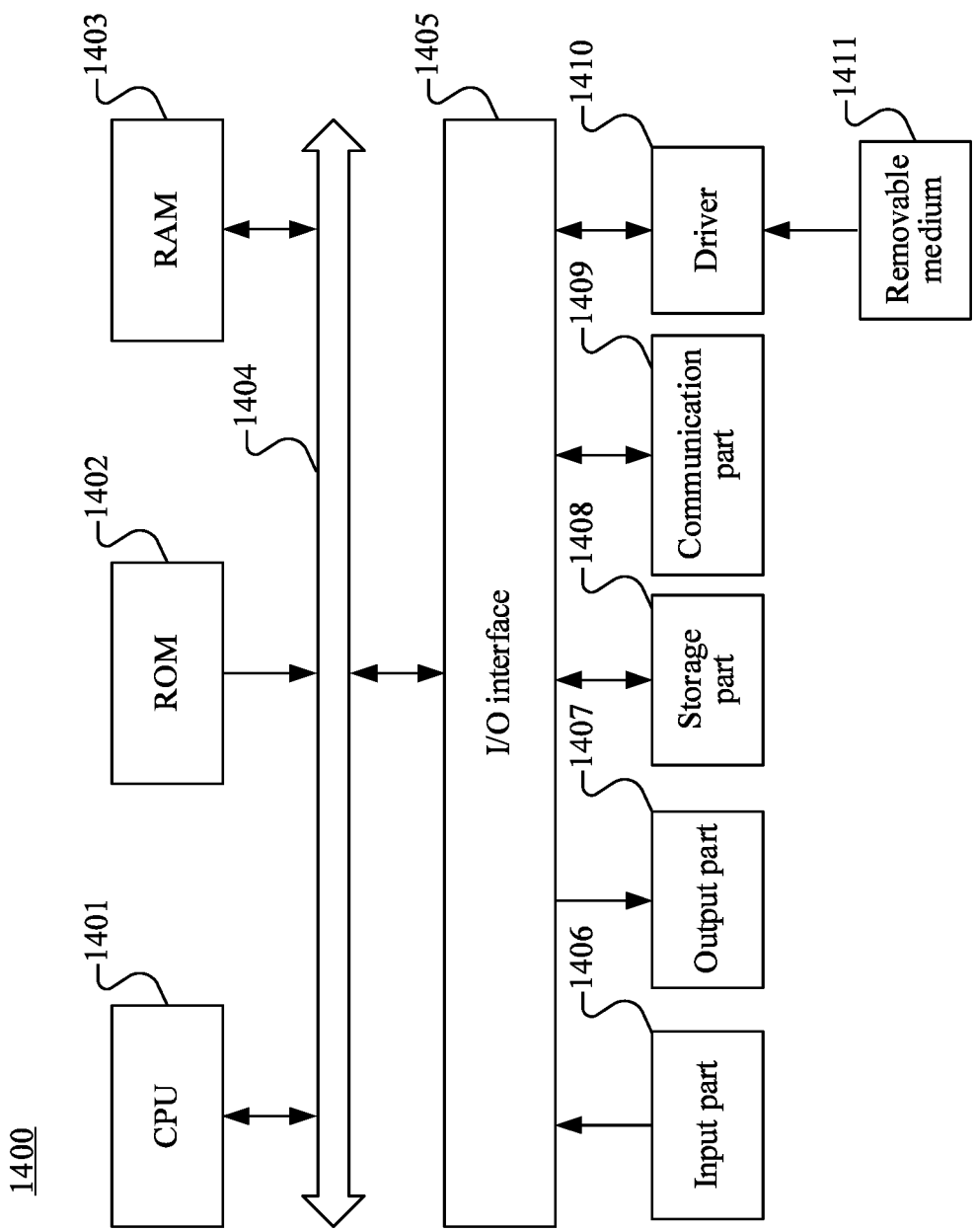
FIG. 14 shows a schematic structural diagram of a computer system suitable for realizing an electronic device according to an embodiment of this application.

FIG. 14 is a schematic structural diagram of a computer system adapted to implement an electronic device according to an embodiment of this application.

A computer system 1400 of the electronic device shown in FIG. 14 is merely an example, and does not constitute any limitation on functions and use ranges of the embodiments of this application.

As shown in FIG. 14, the computer system 1400 includes a central processing unit (CPU) 1401, which may perform various suitable actions and processing based on a program stored in a read-only memory (ROM) 1402 or a program loaded from a storage part 1408 into a random access memory (RAM) 1403, for instance, perform the method described in the foregoing embodiments. The RAM 1403 further stores various programs and data required for system operations. The CPU 1401, the ROM 1402, and the RAM 1403 are connected to each other through a bus 1404. An input/output (I/O) interface 1405 is also connected to the bus 1404.

The following components are connected to the I/O interface 1405: an input part 1406 including a keyboard, a mouse, or the like, an output part 1407 including a cathode ray tube (CRT), a liquid crystal display (LCD), a speaker, or the like, a storage part 1408 including a hard disk, or the like, and a communication part 1409 including a network interface card such as a local area network (LAN) card or a modem. The communication part 1409 performs communication processing by using a network such as the Internet. A driver 1410 is also connected to the I/O interface 1405 as required. A removable medium 1411, such as a magnetic disk, an optical disc, a magneto-optical disk, or a semiconductor memory, is installed on the drive 1410 as required, so that a computer program read from the removable medium is installed into the storage part 1408 as required.

Particularly, according to an embodiment of this application, the processes described in the following by referring to the flowcharts may be implemented as computer software programs. For instance, an embodiment of this application includes a computer program product. The computer program product includes a computer program stored in a computer-readable medium. The computer program includes a computer program used for performing a method shown in the flowchart. In such an embodiment, by using the communication part 1409, the computer program may be downloaded and installed from a network, and/or installed from the removable medium 1411. When the computer program is executed by the CPU 1401, the various functions defined in the system of this application are executed.

The computer-readable medium shown in the embodiments of this application may be a computer-readable signal medium or a computer-readable storage medium or any combination of the two. The computer-readable storage medium may be, for instance, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium including or storing a program, and the program may be used by or used in combination with an instruction execution system, an apparatus, or a device. In this application, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in an order different from that annotated in an accompanying drawing. For instance, actually two boxes shown in succession may be performed basically in parallel, and sometimes the two boxes may be performed in a reverse order. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solution of the implementations of this application may be implemented in a form of a software product. The software product may be stored in a non-volatile storage medium (which may be a CD-ROM, a USB flash drive, a removable hard disk, or the like) or on a network, and includes several instructions for instructing a computing device (which may be a personal computer, a server, a touch terminal, network device, or the like) to perform the methods according to the implementations of this application.

After considering the specification and practicing the implementations of this application, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

This application is not limited to the precise structures described above and shown in the accompanying drawings, and various modifications and changes can be made without departing from the scope of this application. The scope of this application is subject only to the appended claims.

What is claimed is:

1. A communication method, executed by an electronic device, the communication method comprising:

generating a second message frame, the second message frame comprising identifier information of a plurality of device groups, each device group including two or more access devices and at least one access device being a member of both a first device group and a second device group of the plurality of device groups, and resource allocation information of each access device in the each device group for respective data transmission to be performed subsequently, further including (i) generating the identifier information of the device group according to an association identifier of each access device comprised in the device group registered with the electronic device and (ii) splicing partial bits of the association identifiers of the two or more access devices in the device group, to obtain bits of the identifier information of the device group;

after transmitting the second message frame to the each access device in the each device group, generating a first message frame, the first message frame comprising group indication information of the two or more access devices, and the group indication information being configured for indicating information about the each device group that performs respective data transmission after a transmission of the first message frame, wherein the group indication information comprises (i) a first field, (ii) one or more second fields and (iii) at least one third field, the first field is configured for indicating a quantity of the plurality of device groups that perform data transmission after the transmission of the first message frame, and the quantity is equal to the number of the one or more second fields and each of the one or more second fields is configured for indicating the identifier information of a respective one of the plurality of device groups that performs data transmission after the transmission of the first message frame and a value of the at least one third field is configured for indicating information about at least one device that performs data transmission after the transmission of the first message frame, wherein the at least one device indicated by the at least third field and each device in the device group indicated by the second field immediately preceding the at least third field have a same channel access order during the data transmission;

transmitting the first message frame to the plurality of device groups, to trigger the two or more access devices in each of the plurality of device groups indicated by the group indication information to perform the respective data transmission; and receiving, in accordance with an order of the respective identifier information of the each device group within the one or more second fields of the group indication information, the respective data transmission from the two or more access devices in the each device group, the respective data transmission from the two or more access devices in the each device group being in conformance with the resource allocation information in the second message frame and the respective data transmission including first data transmission by the at least one access device as a member of the first device group and second data transmission by the at least one access device as a member of the second device group, respectively.

2. The communication method according to claim 1, wherein the order in which each of the one or more second fields comprised in the group indication information is arranged in the group indication information is configured for indicating a channel access order of the plurality of device groups indicated by the one or more second fields.

3. The communication method according to claim 1, wherein the first message frame is a trigger frame, and the group indication information is multiplexed with a device information field of the trigger frame.

4. The communication method according to claim 1, wherein the first message frame further comprises a trigger type field, the trigger type field being configured for indicating a type of the first message frame; and
in a case where the first message frame is a trigger frame, the trigger type field is multiplexed with a common information field of the trigger frame.

5. An electronic device, comprising:
one or more processors; and
a storage apparatus, configured to store one or more programs, the one or more programs, when executed by the one or more processors, causing the electronic device to perform a plurality of operations including:
generating a second message frame, the second message frame comprising identifier information of a plurality of device groups, each device group including two or more access devices and at least one access device being a member of both a first device group and a second device group of the plurality of device groups, and resource allocation information of each access device in the each device group for respective data transmission to be performed subsequently, further including (i) generating the identifier information of the device group according to an association identifier of each access device comprised in the device group registered with the electronic device and (ii) splicing partial bits of the association identifiers of the two or more access devices in the device group, to obtain bits of the identifier information of the device group;
after transmitting the second message frame to the each access device in the each device group, generating a first message frame, the first message frame comprising group indication information of the two or more access devices, and the group indication information being configured for indicating information about the each device group that performs respective data transmission after a transmission of the first message frame, wherein the group indication information comprises (i) a first field, (ii) one or more second fields and (iii) at least one third field, the first field is configured for indicating a quantity of the plurality of device groups that perform data transmission after the transmission of the first message frame, and the quantity is equal to the number of the one or more second fields and each of the one or more second fields is configured for indicating the identifier information of a respective one of the plurality of device groups that performs data transmission after the transmission of the first message frame and a value of the at least one third field is configured for indicating information about at least one device that performs data transmission after the transmission of the first message frame, wherein the at least one device indicated by the at least third field and each device in the device group indicated by the second field immediately preceding the at least third field have a same channel access order during the data transmission;

transmitting the first message frame to the plurality of device groups, to trigger the two or more access devices in each of the plurality of device groups indicated by the group indication information to perform the respective data transmission; and receiving, in accordance with an order of the respective identifier information of the each device group within the one or more second fields of the group indication information, the respective data transmission from the two or more access devices in the each device group, the respective data transmission from the two or more access devices in the each device group being in conformance with the resource allocation information in the second message frame and the respective data transmission including first data transmission by the at least one access device as a member of the first device group and second data transmission by the at least one access device as a member of the second device group, respectively.

6. The electronic device according to claim 5, wherein the first message frame is a trigger frame, and the group indication information is multiplexed with a device information field of the trigger frame.

7. The electronic device according to claim 5, wherein the first message frame further comprises a trigger type field, the trigger type field being configured for indicating a type of the first message frame; and
in a case where the first message frame is a trigger frame, the trigger type field is multiplexed with a common information field of the trigger frame.

8. The electronic device according to claim 5, wherein the order in which each of the one or more second fields comprised in the group indication information is arranged in the group indication information is configured for indicating a channel access order of the plurality of device groups indicated by the one or more second fields.

9. A non-transitory computer-readable storage medium, storing a plurality of computer programs that, when executed by a processor of an electronic device, cause the electronic device to perform a plurality of operations including:
generating a second message frame, the second message frame comprising identifier information of a plurality of device groups, each device group including two or more access devices and at least one access device being a member of both a first device group and a second device group of the plurality of device groups, and resource allocation information of each access device in the each device group for respective data transmission to be performed subsequently, further including (i) generating the identifier information of the device group according to an association identifier of each access device comprised in the device group registered with the electronic device and (ii) splicing partial bits of the association identifiers of the two or more access devices in the device group, to obtain bits of the identifier information of the device group;

after transmitting the second message frame to the each access device in the each device group, generating a first message frame, the first message frame comprising group indication information of the two or more access devices, and the group indication information being configured for indicating information about the each device group that performs respective data transmission after a transmission of the first message frame, wherein the group indication information comprises (i) a first field, (ii) one or more second fields and (iii) at least one third field, the first field is configured for indicating a quantity of the plurality of device groups that perform data transmission after the transmission of the first message frame, and the quantity is equal to the number of the one or more second fields and each of the one or more second fields is configured for indicating the identifier information of a respective one of the plurality of device groups that performs data transmission after the transmission of the first message frame and a value of the at least one third field is configured for indicating information about at least one device that performs data transmission after the transmission of the first message frame, wherein the at least one device indicated by the at least third field and each device in the device group indicated by the second field immediately preceding the at least third field have a same channel access order during the data transmission;

transmitting the first message frame to the plurality of device groups, to trigger the two or more access devices in each of the plurality of device groups indicated by the group indication information to perform the respective data transmission; and receiving, in accordance with an order of the respective identifier information of the each device group within the one or more second fields of the group indication information, the respective data transmission from the two or more access devices in the each device group, the respective data transmission from the two or more access devices in the each device group being in conformance with the resource allocation information in the second message frame and the respective data transmission including first data transmission by the at least one access device as a member of the first device group and second data transmission by the at least one access device as a member of the second device group, respectively.

10. The non-transitory computer-readable storage medium according to claim 9, wherein the first message frame is a trigger frame, and the group indication information is multiplexed with a device information field of the trigger frame.

11. The non-transitory computer-readable storage medium according to claim 9, wherein the order in which each of the one or more second fields comprised in the group indication information is arranged in the group indication information is configured for indicating a channel access order of the plurality of device groups indicated by the one or more second fields.

12. The non-transitory computer-readable storage medium according to claim 9, wherein the first message frame further comprises a trigger type field, the trigger type field being configured for indicating a type of the first message frame; and in a case where the first message frame is a trigger frame, the trigger type field is multiplexed with a common information field of the trigger frame.

* * * * *